(12) United States Patent
Nakamura et al.

(10) Patent No.: US 7,486,034 B2
(45) Date of Patent: Feb. 3, 2009

(54) POWER SUPPLY DEVICE FOR VEHICLE AND METHOD OF CONTROLLING THE SAME

(75) Inventors: Makoto Nakamura, Okazaki (JP); Hichirosai Oyobe, Toyota (JP); Tsuyoshi Yano, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 209 days.

(21) Appl. No.: 11/493,572

(22) Filed: Jul. 27, 2006

(65) Prior Publication Data

US 2007/0029986 A1 Feb. 8, 2007

(30) Foreign Application Priority Data

Aug. 8, 2005 (JP) ............................. 2005-229849

(51) Int. Cl.
*H02P 1/00* (2006.01)

(52) U.S. Cl. ...................... 318/139; 318/262; 307/10.1; 320/132; 320/163

(58) Field of Classification Search ................... 318/34, 318/41, 25, 262, 376, 282, 800, 139, 254; 320/132, 137, 116, 163; 307/10.1
See application file for complete search history.

(56) References Cited

U.S. PATENT DOCUMENTS

| | | | | |
|---|---|---|---|---|
| 5,710,699 A * | 1/1998 | King et al. | ................... | 363/132 |
| 5,719,486 A * | 2/1998 | Taniguchi et al. | ............. | 322/28 |
| 5,883,496 A * | 3/1999 | Esaki et al. | ................. | 320/132 |
| 6,426,608 B2 * | 7/2002 | Amano et al. | ............... | 320/163 |
| 6,452,362 B1 * | 9/2002 | Choo | ........................ | 320/116 |
| 6,653,745 B1 * | 11/2003 | Masaki et al. | ............. | 307/10.1 |
| 6,861,767 B2 * | 3/2005 | Amano et al. | ............. | 307/10.1 |
| 7,049,784 B2 * | 5/2006 | Suzuki | ........................ | 318/636 |
| 7,122,991 B2 * | 10/2006 | Kitajima et al. | ............. | 318/800 |
| 7,304,444 B2 * | 12/2007 | Takano et al. | .................. | 318/34 |
| 2001/0052760 A1 * | 12/2001 | Amano et al. | ............... | 320/163 |
| 2004/0160201 A1 * | 8/2004 | Rahman et al. | ............... | 318/41 |
| 2004/0207205 A1 * | 10/2004 | Kikuchi et al. | ............ | 290/40 C |
| 2004/0207349 A1 * | 10/2004 | Suzuki | ........................ | 318/254 |
| 2005/0151509 A1 * | 7/2005 | Cook | ........................ | 320/116 |
| 2005/0151513 A1 * | 7/2005 | Cook et al. | ................. | 320/137 |
| 2005/0151517 A1 * | 7/2005 | Cook et al. | ................. | 323/207 |

(Continued)

FOREIGN PATENT DOCUMENTS

JP A-08-126121 5/1996

(Continued)

*Primary Examiner*—Paul Ip
(74) *Attorney, Agent, or Firm*—Oliff & Berridge, PLC

(57) ABSTRACT

A power supply device for a vehicle includes a battery serving as a first electric storage device, a battery serving as a second electric storage device, a motor generator driving a wheel, a selection switch selecting one of the first and second electric storage devices and connecting the selected electric storage device to the motor generator, and a control device controlling switching of the selection switch in accordance with a state of charge of each of the first and second electric storage devices. In the case where the selection switch selects the first electric storage device, when charging is performed and the state of charge of the first electric storage device becomes higher than a first prescribed level, the control device instructs the selection switch to select the second electric storage device.

22 Claims, 10 Drawing Sheets

U.S. PATENT DOCUMENTS

| | | | |
|---|---|---|---|
| 2005/0253458 A1* | 11/2005 | Omae et al. | 307/10.1 |
| 2006/0006832 A1* | 1/2006 | Kitajima et al. | 318/800 |
| 2007/0219670 A1* | 9/2007 | Tanaka et al. | 700/295 |
| 2007/0284159 A1* | 12/2007 | Takami et al. | 180/65.1 |
| 2007/0289794 A1* | 12/2007 | Ishikawa et al. | 180/165 |
| 2008/0024078 A1* | 1/2008 | Oyobe et al. | 318/262 |
| 2008/0067972 A1* | 3/2008 | Takami et al. | 320/103 |

FOREIGN PATENT DOCUMENTS

| | | |
|---|---|---|
| JP | A-2003-023703 | 1/2003 |
| JP | A-2003-235169 | 8/2003 |
| JP | A-2004-027844 | 1/2004 |

* cited by examiner

| CONTROL DURING CHARGING | VOLTAGE STEP UP CONVERTER | | FIRST INVERTER | | SECOND INVERTER | |
|---|---|---|---|---|---|---|
| | Q1 | Q2 | Q11 | Q12 | Q21 | Q22 |
| VAC>0:(V1>V2) | ON | OFF | OFF OR SWITCHING | SWITCHING | OFF | ON |
| VAC<0:(V1<V2) | ON | OFF | OFF | ON | OFF OR SWITCHING | SWITCHING |

POWER SUPPLY DEVICE FOR VEHICLE AND METHOD OF CONTROLLING THE SAME

This nonprovisional application is based on Japanese Patent Application No. 2005-229849 filed with the Japan Patent Office on Aug. 8, 2005, the entire contents of which are hereby incorporated by reference.

BACKGROUND OF THE INVENTION

1. Field of the Invention

The present invention relates to a power supply device for a vehicle, and particularly to a power supply device for a vehicle, the power supply device having two electric storage devices.

2. Description of the Background Art

In recent years, attention has been focused on an electric vehicle and a fuel-cell vehicle that use a motor in driving a wheel, and a hybrid vehicle that uses a motor and an engine in combination, and other vehicles, as an environmental-friendly vehicle.

For example, an electric vehicle requires a charging device for charging a battery. The charging device may be mounted on a vehicle, or provided at a certain location in a fixed manner.

In the case where the charging device is provided at a certain location in a fixed manner, it is necessary to move the electric vehicle to that place for charging. In other words, the charging device being provided in a fixed manner is disadvantageous in that the battery cannot be charged at a place other than the place where the charging device is provided in a fixed manner.

In contrast, if the charging device is mounted on the vehicle, there exists a problem of increase in vehicle weight. In order to solve the problem, there has been proposed a device that charges a battery from a commercial power supply at home by using a coil of a drive motor as a reactor, and by controlling a circuit element of an inverter that controls the motor. As to this device, the existing part is utilized so that the number of parts to be newly mounted is reduced, and weight increase is avoided.

Japanese Patent Laying-Open No. 08-126121 discloses a technique of preventing rotation of a rotor in an electric vehicle by allowing magnetic fields generated by three-phase coils to cancel each other out, in order to prevent movement of the vehicle caused by the rotor rotation, when the coils of the drive motor are used as a reactor to charge a battery.

If a battery in an electric vehicle as well as a hybrid vehicle can be charged from a commercial power supply at home, there may be a merit in that the frequency with which one has to go to the gas station for refueling is decreased, or may be an economical merit in a country where commercial electric power is inexpensive.

However, the Japanese Patent Laying-Open No. 08-126121 relates to an electric vehicle having two drive motors mounted on the left and right sides or the front and rear sides thereof, and hence the disclosure cannot be applied as it is to the hybrid vehicle.

Furthermore, a hybrid vehicle commercially available at present has a storage battery with small capacity, and hence even if the battery can be charged at home, an amount of energy to be supplied at that time is small. Accordingly, just after the vehicle runs for a while, a state of charge (SOC) of the storage battery decreases and the engine is required to start for activating an electric generator to generate electric power. Therefore, refueling with petrol is frequently required.

Furthermore, the hybrid vehicle performs regenerative braking in a downslope and recaptures electric power at that time to charge the storage battery. However, the capacity of the storage battery is so small that, when a running route includes a long downslope, power generated by regenerative braking is discarded as heat, once a state of charge of the storage battery reaches a prescribed value.

FIG. 14 is a diagram for describing electric power discarded as heat during regenerative braking.

Referring to FIG. 14, the storage battery is controlled such that it is used within 40-80% of the SOC range, for example, so as not to shorten its life. When the SOC of the storage battery is 60% at time t0, chargeable capacity is only 20%.

In the case of a long downslope, the storage battery is charged with regenerative electric power generated at times t0-t1. As a result, the SOC of the storage battery increases from 60% to 80%.

If the storage battery is further charged during a period from time t1 to time t2 at which the slope ends, the life of the storage battery may be shortened. The regenerative electric power generated is therefore discarded as heat. If even a part of electric power to be discarded can be recaptured, it is possible to implement a hybrid vehicle with higher energy efficiency.

SUMMARY OF THE INVENTION

An object of the present invention is to provide a power supply device for a vehicle that has an electric storage device mounted thereon, that has improved energy efficiency, and that can be driven for a long time without the need of refueling.

To summarize, the present invention is a power supply device for a vehicle, includes: a first electric storage device; a second electric storage device; a first rotating electric machine driving a wheel; a selection switch selecting one of the first and second electric storage devices and connecting the selected electric storage device to the first rotating electric machine; and a control device controlling switching of the selection switch in accordance with a state of charge of each of the first and second electric storage devices. In a case where the selection switch selects the first electric storage device, when charging is performed so that the state of charge of the first electric storage device becomes higher than a first prescribed level, the control device instructs the selection switch to select the second electric storage device.

Preferably, the charging in the case where the selection switch selects the first electric storage device is performed with regenerative electric power generated during a regenerative braking operation of the first rotating electric machine during running of the vehicle.

Preferably, in a case where the selection switch selects the second electric storage device, when the state of charge of the second electric storage device becomes lower than a second prescribed level, the control device instructs the selection switch to select the first electric storage device.

Preferably, the second electric storage device has larger electricity storage capacity than the first electric storage device has.

Preferably, the first electric storage device has larger maximum chargeable electric power than the second electric storage device has.

Preferably, the power supply device for the vehicle further includes an input unit for receiving electric power supplied from outside of the vehicle and charging at least the second electric storage device.

More preferably, the power supply device for the vehicle further includes: a first inverter provided corresponding to the first rotating electric machine; a second rotating electric machine; and a second inverter provided corresponding to the second rotating electric machine. The input unit includes a first terminal connected to the first rotating electric machine, and a second terminal connected to the second rotating electric machine. The control device controls the first and second inverters such that an alternating-current electric power supplied to the first and second terminals is converted into a direct-current electric power and supplied to the second electric storage device.

More preferably, a rotary shaft of the first rotating electric machine is mechanically coupled to a rotary shaft of the wheel. The power supply device for the vehicle further includes an internal combustion engine having a crankshaft mechanically coupled to a rotary shaft of the second rotating electric machine.

A power supply device for a vehicle according to another aspect of the present invention includes: a first electric storage device; a second electric storage device; a first rotating electric machine receiving electric power from the first electric storage device and driving a wheel; a voltage converting unit provided between the first and second electric storage devices, for receiving and transferring electric power between the first and second electric storage devices; and a control device controlling the voltage converting unit in accordance with a state of charge of each of the first and second electric storage devices. In a case where charging of the first electric storage device is performed, when the state of charge of the first electric storage device becomes higher than a first prescribed level, the control device instructs the voltage converting unit to perform a voltage converting operation such that the second electric storage device is charged from the first electric storage device.

Preferably, the charging of the first electric storage device is performed with regenerative electric power generated during a regenerative braking operation of the first rotating electric machine during running of the vehicle.

Preferably, when energy in the first electric storage device is consumed and the state of charge of the first electric storage device becomes lower than a second prescribed level, the control device instructs the voltage converting unit to perform the voltage converting operation such that the first electric storage device is charged from the second electric storage device.

Preferably, the second electric storage device has larger electricity storage capacity than the first electric storage device has.

Preferably, the first electric storage device has larger maximum chargeable electric power than the second electric storage device has.

Preferably, the power supply device for a vehicle further includes an input unit for receiving electric power supplied from outside of the vehicle and charging at least the second electric storage device.

More preferably, the power supply device for a vehicle further includes: a first inverter provided corresponding to the first rotating electric machine; a second rotating electric machine; and a second inverter provided corresponding to the second rotating electric machine. The input unit includes a first terminal connected to the first rotating electric machine, and a second terminal connected to the second rotating electric machine. The control device controls the first and second inverters and the voltage converting unit such that an alternating-current electric power supplied to the first and second terminals is converted into a direct-current electric power, and supplied to the second electric storage device.

More preferably, a rotary shaft of the first rotating electric machine is mechanically coupled to a rotary shaft of a wheel. The power supply device for the vehicle further includes an internal combustion engine having a crankshaft mechanically coupled to a rotary shaft of the second rotating electric machine.

A method according to still another aspect of the present invention is a method of controlling a power supply device for a vehicle, the power supply device including first and second electric storage devices, a first rotating electric machine driving a wheel, and a selection switch selecting one of the first and second electric storage devices and connecting the selected electric storage device to the first rotating electric machine, includes the steps of: determining whether or not charging is performed when the selection switch selects the first electric storage device; determining whether or not a state of charge of the first electric storage device is higher than a first prescribed level; and instructing the selection switch to select the second electric storage device when the state of charge of the first electric storage device becomes higher than the first prescribed level.

Preferably, the charging when the selection switch selects the first electric storage device is performed with regenerative electric power generated during a regenerative braking operation of the first rotating electric machine during running of the vehicle.

A method according to a further aspect of the present invention is a method of controlling a power supply device for a vehicle, the power supply device including first and second electric storage devices, a first rotating electric machine receiving electric power from the first electric storage device and driving a wheel, and a voltage converting unit provided between the first and second electric storage devices and receiving and transferring electric power between the first and second electric storage devices, includes the steps of: determining whether or not charging of the first electric storage device is performed; determining whether or not a state of charge of the first electric storage device becomes higher than a first prescribed level; and instructing the voltage converting unit to perform a voltage converting operation such that the second electric storage device is charged from the first electric storage device when the state of charge of the first electric storage device becomes higher than the first prescribed level.

Preferably, the charging of the first electric storage device is performed with regenerative electric power generated during a regenerative braking operation of the first rotating electric machine during running of the vehicle.

According to the present invention, by mounting two batteries on a vehicle and charging these batteries, it is possible to prolong a distance the vehicle can run or a period of time the vehicle can run for without the need of refueling, and to decrease the frequency of refueling.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
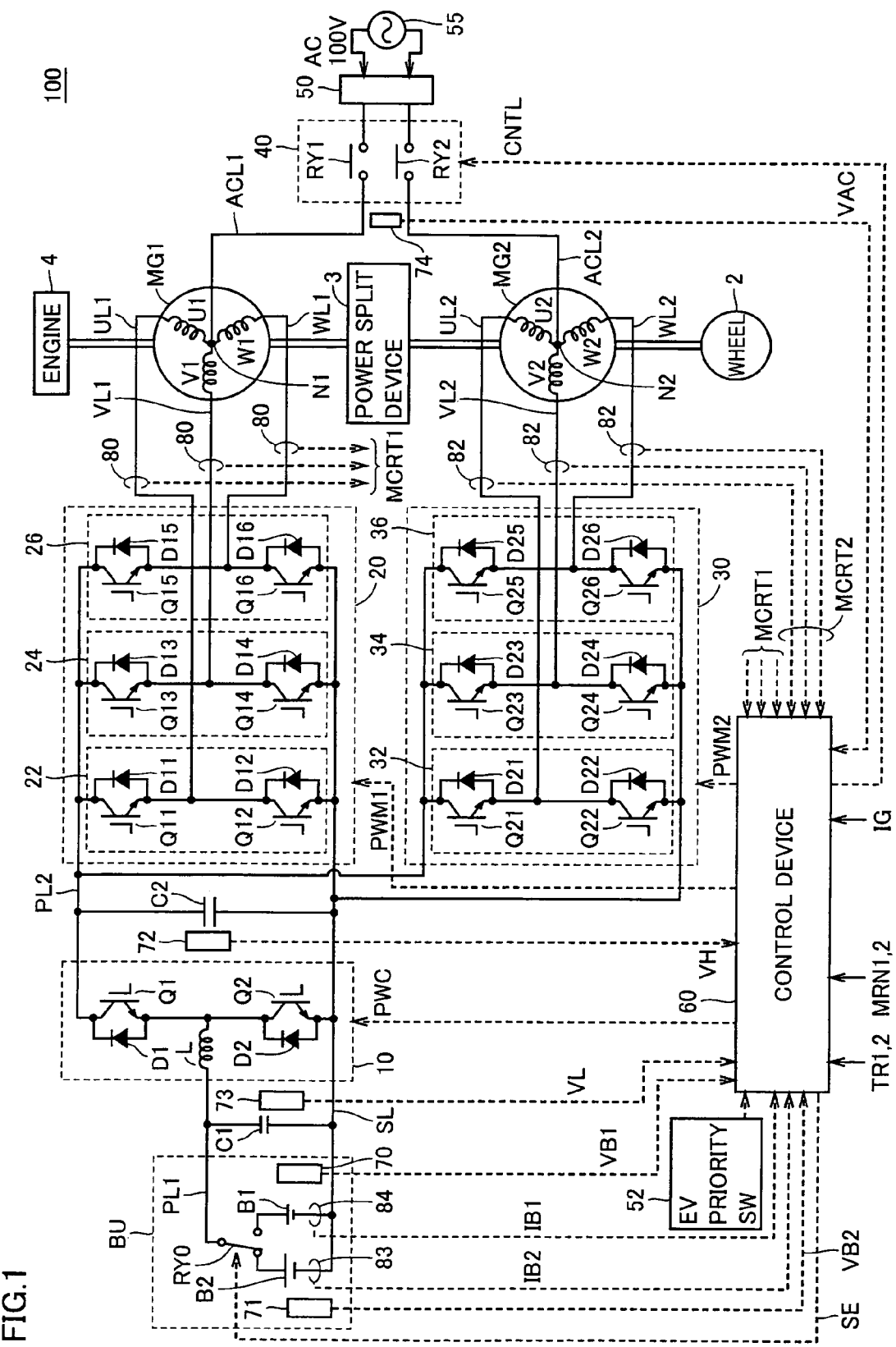
FIG. 1 is a schematic block diagram of a vehicle according to a first embodiment of the present invention.

The embodiments of the present invention will hereinafter be described in detail with reference to the drawings. The same or corresponding portions are denoted by the same reference characters, and the description thereof will not be described.

First Embodiment

FIG. 1 is a schematic block diagram of a vehicle according to a first embodiment of the present invention.

Referring to FIG. 1, vehicle 100 includes a battery unit BU, a voltage step up converter 10, inverters 20, 30, power supply lines PL1, PL2, a ground line SL, U-phase lines UL1, UL2, V-phase lines VL1, VL2, W-phase lines WL1, WL2, motor generators MG1, MG2, an engine 4, a power split device 3, and a wheel 2.

Vehicle 100 is a hybrid vehicle that uses a motor and an engine in combination for driving the wheel.

Power split device 3 is a mechanism connected to engine 4 and motor generators MG1, MG2 for distributing motive power among them. For example, a planetary gear mechanism having three rotary shafts of a sun gear, a planetary carrier, and a ring gear may be used for the power split device. The three rotary shafts are connected to rotary shafts of engine 4, motor generators MG1, MG2, respectively. For example, engine 4 and motor generators MG1, MG2 can mechanically be connected to power split device 3 by allowing a crankshaft of engine 4 to extend through the center of a hollow space in a rotor of motor generator MG1.

A rotary shaft of motor generator MG2 is coupled to wheel 2 through a reduction gear, a running gear, and the like not shown. A speed reducer for the rotary shaft of motor generator MG2 may further be incorporated inside power split device 3.

Motor generator MG1 is incorporated in the hybrid vehicle for operating as an electric generator driven by the engine and operating as an electric motor capable of starting the engine, while motor generator MG2 is incorporated in the hybrid vehicle for serving as an electric motor that drives a driving wheel of the hybrid vehicle.

Each of motor generators MG1, MG2 is, for example, a three-phase alternating synchronous electric motor. Motor generator MG1 includes three-phase coils composed of a U-phase coil U1, a V-phase coil V1, and a W-phase coil W1, as a stator coil. Motor generator MG2 includes three-phase coils composed of a U-phase coil U2, a V-phase coil V2, and a W-phase coil W2, as a stator coil.

Motor generator MG1 uses an engine output to thereby generate a three-phase alternating voltage, and outputs the generated three-phase alternating voltage to inverter 20. Furthermore, motor generator MG1 generates driving force by three-phase alternating voltage received from inverter 20 to thereby start the engine.

Motor generator MG2 generates driving torque for the vehicle by three-phase alternating voltage received from inverter 30. Furthermore, motor generator MG2 generates a three-phase alternating voltage during regenerative braking of the vehicle and outputs the same to inverter 30.

Battery unit BU includes batteries B1, B2 serving as electric storage devices whose negative electrodes are both connected to a ground line SL, a selection switch RY0 that selects one of batteries B1, B2 and connects the selected battery to a vehicle load, voltage sensors 70, 71 that measure voltages of batteries B1, B2, respectively, and current sensors 84, 83 that measure currents of batteries B1, B2, respectively. The vehicle load includes motor generators MG1, MG2, inverters 20, 30, and voltage step up converter 10 that supplies a stepped-up voltage to inverters 20, 30.

In battery unit BU, a combination of batteries B1, B2 is selected such that battery B2 has larger electricity storage capacity than battery B1 has, and instead that battery B1 has larger maximum allowed output electric power than battery B2 has. In this case, battery B1 usually has larger maximum chargeable electric power than battery B2 has. For example, battery B1 can store electric power of up to 20 kW, while battery B2 can store electric power of up to 5 kW.

A secondary battery such as a nickel metal hydride battery or a lithium-ion battery may be used for battery B1. In this case, an inexpensive, high-capacity, lead-acid battery may be used for battery B2.

Alternatively, a high-capacity electric double layer capacitor may be substituted for battery B1. In this case, a battery that has smaller maximum allowed output electric power and larger electricity storage capacity, when compared with the high-capacity electric double layer capacitor, may be used for battery B2. In this case, a secondary battery such as a nickel metal hydride battery or a lithium-ion battery may be used for battery B2.

In other words, as the performance of an electric storage device improves, a combination of battery B1 and battery B2 may widely be varied for use. By combining and using two electric storage devices having different characteristics, it is possible to implement the power supply device for the vehicle, which power supply device can store a large amount of electric power and has high output performance.

Battery unit BU outputs a direct voltage output from battery B1 or B2 to voltage step up converter 10. Furthermore, battery B1 or B2 inside battery unit BU are charged with a direct voltage output from voltage step up converter 10.

Selection switch RY0 is configured to assure that, when one of batteries B1 and B2 is connected to power supply line PL1, the other of batteries B1 and B2 is disconnected from power supply line PL1, in order to prevent a short-circuit between a positive electrode of battery B1 and a positive electrode of battery B2. This is because batteries B1, B2 are different in characteristic and sometimes in state of charge (SOC), and hence it is necessary to avoid directly connecting the positive electrodes thereof to each other, so as to prevent an excessive current flowing from one to the other of the batteries.

Voltage step up converter 10 includes a reactor L, NPN-type transistors Q1, Q2, and diodes D1, D2. Reactor L has one end connected to power supply line PL1, and the other end connected to a connection point of NPN-type transistors Q1, Q2. NPN-type transistors Q1, Q2 are connected in series between power supply line PL2 and ground line SL, and each receives a signal PWC from a control device 60 at its base. Diodes D1, D2 are connected between the collectors and the emitters of NPN-type transistors Q1, Q2, respectively, so that a current flows from the emitter side to the collector side.

For the above-described NPN-type transistor and the NPN-type transistor described herein, an insulated gate bipolar transistor (IGBT) may be used. Furthermore, an electric power switching element such as a power metal oxide semiconductor field-effect transistor (MOSFET) may be substituted for the NPN-type transistor.

Inverter 20 includes a U-phase arm 22, a V-phase arm 24, and a W-phase arm 26. U-phase arm 22, V-phase arm 24, and W-phase arm 26 are connected in parallel between power supply line PL2 and ground line SL.

U-phase arm 22 includes NPN-type transistors Q11, Q12 connected in series. V-phase arm 24 includes NPN-type transistors Q13, Q14 connected in series. W-phase arm 26 includes NPN-type transistors Q15, Q16 connected in series. Diodes D11-D16 are connected between the collectors and the emitters of the NPN-type transistors Q11-Q16, respectively, for allowing a current to flow from the emitter side to the collector side. The connection points of the NPN-type transistors in the U, V, and W-phase arms are connected to coil ends different from a neutral point N1 of the U, V, and W-phase coils of motor generator MG1 through U, V, and W-phase lines UL1, VL1, and WL1, respectively.

Inverter 30 includes a U-phase arm 32, a V-phase arm 34, and a W-phase arm 36. U-phase arm 32, V-phase arm 34, and W-phase arm 36 are connected in parallel between power supply line PL2 and ground line SL.

U-phase arm 32 includes NPN-type transistors Q21, Q22 connected in series. V-phase arm 34 includes NPN-type transistors Q23, Q24 connected in series. W-phase arm 36 includes NPN-type transistors Q25, Q26 connected in series. Diodes D21-D26 are connected between the collectors and the emitters of NPN-type transistors Q21-Q26, respectively, for allowing a current to flow from the emitter side to the collector side. In inverter 30, the connection points of the NPN-type transistors in the U, V, and W-phase arms are also connected to coil ends different from a neutral point N2 of the U, V, and W-phase coils of motor generator MG2 through U, V, and W-phase lines UL2, VL2, and WL2, respectively.

Vehicle 100 further includes capacitors C1, C2, a relay circuit 40, a connector 50, an EV priority switch 52, a control device 60, AC lines ACL1, ACL2, voltage sensors 72-74, and current sensors 80, 82.

Capacitor C1 is connected between power supply line PL1 and ground line SL, to reduce the effect caused by voltage fluctuations on battery B1 and voltage step up converter 10. A voltage VL between power supply line PL1 and ground line SL is measured by voltage sensor 73.

Capacitor C2 is connected between power supply line PL2 and ground line SL, to reduce the effect caused by voltage fluctuations on inverters 20, 30 and voltage step up converter 10. A voltage VH between power supply line PL2 and ground line SL is measured by voltage sensor 72.

Voltage step up converter 10 steps up a direct voltage supplied from battery unit BU through power supply line PL1 and outputs the same to power supply line PL2. More specifically, based on signal PWC from control device 60, voltage step up converter 10 performs a voltage step up operation by storing in reactor L a current flowing in accordance with a switching operation of NPN-type transistor Q2, as magnetic field energy, and by releasing the stored energy by allowing a current to flow to power supply line PL2 through diode D1 in synchronization with a timing at which NPN-type transistor Q2 is turned off.

Furthermore, based on signal PWC from control device 60, voltage step up converter 10 steps down a direct voltage received from either of, or both of inverters 20 and 30 through power supply line PL2 to a voltage level of battery unit BU, and charges the batteries inside battery unit BU.

Based on a signal PWM1 from control device 60, inverter 20 converts a direct voltage supplied from power supply line PL2 into a three-phase alternating voltage, and drives motor generator MG1.

Motor generator MG1 is thereby driven to generate torque specified by a torque control value TR1. Furthermore, based on signal PWM1 from control device 60, inverter 20 converts the three-phase alternating voltage, which is generated by motor generator MG1 that receives an output from the engine, into a direct voltage, and outputs the obtained direct voltage to power supply line PL2.

Based on a signal PWM2 from control device 60, inverter 30 converts the direct voltage supplied from power supply line PL2 into a three-phase alternating voltage, and drives motor generator MG2.

Motor generator MG2 is thereby driven to generate torque specified by a torque control value TR2. Furthermore, during regenerative braking of vehicle 100, namely, the hybrid vehicle, based on signal PWM2 from control device 60, inverter 30 converts the three-phase alternating voltage, which is generated by motor generator MG2 that receives a turning force from a drive shaft, into a direct voltage, and outputs the obtained direct voltage to power supply line PL2.

The regenerative braking referred to herein includes braking with regenerative power generation when a driver that drives the hybrid vehicle operates a foot brake, and deceleration (or termination of acceleration) of the vehicle with regenerative power generation by lifting the driver's foot off from an accelerator pedal during running of the vehicle, without operating a foot brake.

Relay circuit 40 includes relays RY1, RY2. For relays RY1, RY2, a mechanical contact relay may be used, for example, or alternatively, a semiconductor relay may also be used. Relay RY1 is provided between AC line ACL1 and connector 50, and is turned on/off in accordance with a control signal CNTL from control device 60. Relay RY2 is provided between AC line ACL2 and connector 50, and is turned on/off in accordance with control signal CNTL from control device 60.

Relay circuit 40 connects AC lines ACL1, ACL2 to/disconnects AC lines ACL1, ACL2 from connector 50 in accordance with control signal CNTL from control device 60. In other words, when receiving control signal CNTL at an H (logic high) level from control device 60, relay circuit 40 electrically connects AC lines ACL1, ACL2 to connector 50. When receiving control signal CNTL at an L (logic low) level from control device 60, relay circuit 40 electrically disconnects AC lines ACL1, ACL2 from connector 50.

Connector 50 is a terminal for inputting an alternating voltage from outside to neutral points N1, N2 of motor generators MG1, MG2. For the alternating voltage, an alternating current of 100V, for example, can be input from a commercial power line at home. A voltage VAC between AC lines ACL1 and ACL2 is measured by voltage sensor 74, and the measured value is transmitted to control device 60.

Voltage sensor 70 detects a battery voltage VB1 of battery B1, and outputs the detected battery voltage VB1 to control device 60. Voltage sensor 71 detects a battery voltage VB2 of battery B2, and outputs the detected battery voltage VB2 to control device 60. Voltage sensor 73 detects a voltage across capacitor C1, namely, input voltage VL to voltage step up converter 10, and outputs the detected voltage VL to control device 60. Voltage sensor 72 detects a voltage across capacitor C2, namely, output voltage VH from voltage step up converter 10 (which output voltage VH corresponds to input voltages to inverters 20, 30; the same applies to the following), and outputs the detected voltage VH to control device 60.

Current sensor 80 detects a motor current MCRT1 flowing through motor generator MG1, and outputs the detected motor current MCRT1 to control device 60. Current sensor 82 detects a motor current MCRT2 flowing through motor generator MG2, and outputs the detected motor current MCRT2 to control device 60.

Based on torque control values TR1, TR2 and motor rotation speeds MRN1, MRN2 of motor generators MG1, MG2 output from an electronic control unit (ECU) externally provided, voltage VL from voltage sensor 73, and voltage VH from voltage sensor 72, control device 60 generates signal PWC for driving voltage step up converter 10, and outputs the generated signal PWC to voltage step up converter 10.

Furthermore, based on voltage VH, and motor current MCRT1 and torque control value TR1 of motor generator MG1, control device 60 generates signal PWM1 for driving motor generator MG1, and outputs the generated signal PWM1 to inverter 20. Furthermore, based on voltage VH, and motor current MCRT2 and torque control value TR2 of motor generator MG2, control device 60 generates signal PWM2 for driving motor generator MG2, and outputs the generated signal PWM2 to inverter 30.

Based on a signal IG from an ignition switch (or an ignition key) and state of charge of battery B2 (SOC2), control device 60 generates signals PWM1, PWM2 for controlling inverters 20, 30 such that battery B2 is charged with an alternating voltage for a commercial power supply, which alternating voltage is supplied to neutral points N1, N2 of motor generators MG1, MG2.

Furthermore, based on state of charge of battery B2 (SOC2), control device 60 determines whether or not battery B2 can be charged from outside. When control device 60 determines that battery B2 can be charged, it outputs control signal CNTL at an H level to relay circuit 40. In contrast, when control device 60 determines that battery B2 is approximately fully charged and cannot be charged, it outputs control signal CNTL at an L level to relay circuit 40. When signal IG shows a stopped state of the vehicle, control device 60 stops inverters 20, 30.

In accordance with an instruction provided through EV priority switch 52 by a driver, control device 60 switches between a hybrid running mode in which consumption of petrol in a normal manner is a prerequisite and an EV priority running mode in which the vehicle runs only by a motor with the maximum torque made smaller than in the case of the hybrid running, and electric power in the battery is used as much as possible.

Figure 2:
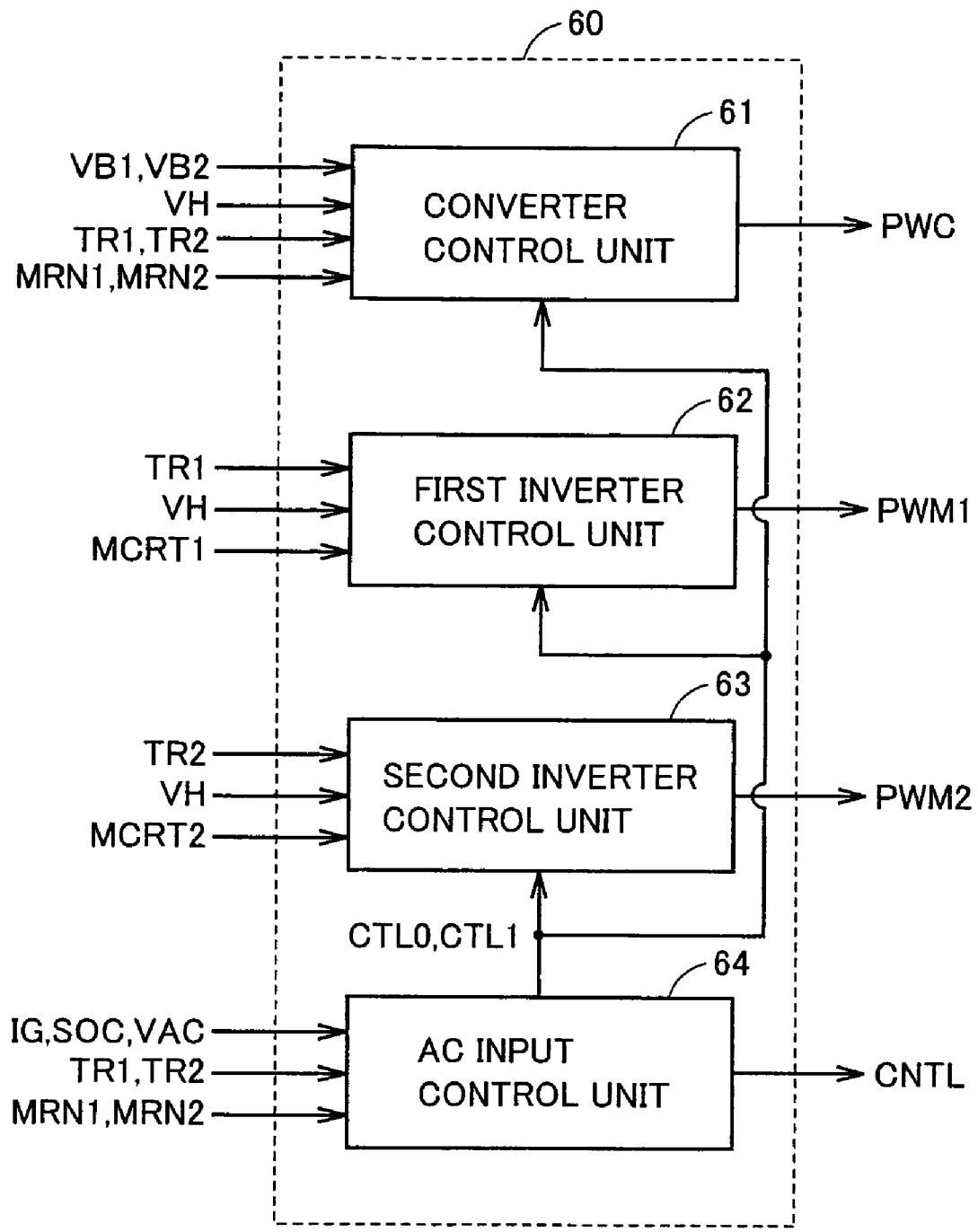
FIG. 2 is a functional block diagram of a control device 60 shown in FIG. 1.

FIG. 2 is a functional block diagram of control device 60 shown in FIG. 1.

Referring to FIG. 2, control device 60 includes a converter control unit 61, a first inverter control unit 62, a second inverter control unit 63, and an AC input control unit 64. Based on battery voltages VB1, VB2, voltage VH, torque control values TR1, TR2, and motor rotation speeds MRN1, MRN2, converter control unit 61 generates signal PWC for turning on/off NPN-type transistors Q1, Q2 in voltage step up converter 10, and outputs the generated signal PWC to voltage step up converter 10.

Based on torque control value TR1 and motor current MCRT1 of motor generator MG1 and voltage VH, first inverter control unit 62 generates signal PWM1 for turning on/off NPN-type transistors Q11-Q16 in inverter 20, and outputs the generated signal PWM1 to inverter 20.

Based on torque control value TR2 and motor current MCRT2 of motor generator MG2 and voltage VH, second inverter control unit 63 generates signal PWM2 for turning on/off NPN-type transistors Q21-Q26 in inverter 30, and outputs the generated signal PWM2 to inverter 30.

Based on torque control values TR1, TR2 and motor rotation speeds MRN1, MRN2, AC input control unit 64 determines a driving state of each of motor generators MG1, MG2, and in accordance with signal IG and the SOC of each of batteries B1, B2, controls the two inverters in a coordinated manner to convert the alternating voltage supplied from outside into a DC voltage and steps up the voltage, so as to charge the battery.

Here, signal IG at an H level is a signal indicating that vehicle 100, namely, the hybrid vehicle is activated, while signal IG at an L level is a signal indicating that the hybrid vehicle is stopped.

In the case where a driving state of each of motor generators MG1, MG2 is a stopped state, and where signal IG also indicates that the hybrid vehicle is stopped, AC input control unit 64 permits a charging operation if the SOC of each of batteries B1, B2 is lower than a prescribed level. Specifically, AC input control unit 64 brings relays RY1, RY2 into conduction by signal CNTL, and if there is an input of voltage VAC, generates a control signal CTL1 in accordance with the input, controls inverters 20, 30 in a coordinated manner, converts the alternating voltage supplied from outside into a DC voltage and steps up the voltage as well, so as to permit charging of the battery.

In contrast, in the case where a driving state of each of motor generators MG1, MG2 is a running state or signal IG indicates that the hybrid vehicle is driven, when the SOC of each of batteries B1, B2 is higher than a prescribed level, AC input control unit 64 does not permit a charging operation. Specifically, AC input control unit 64 causes relays RY1, RY2 to be released by signal CNTL, generates a control signal CTL0, and causes voltage step up converter 10 and inverters 20, 30 to perform a normal operation observed during driving of the vehicle.

Figure 3:
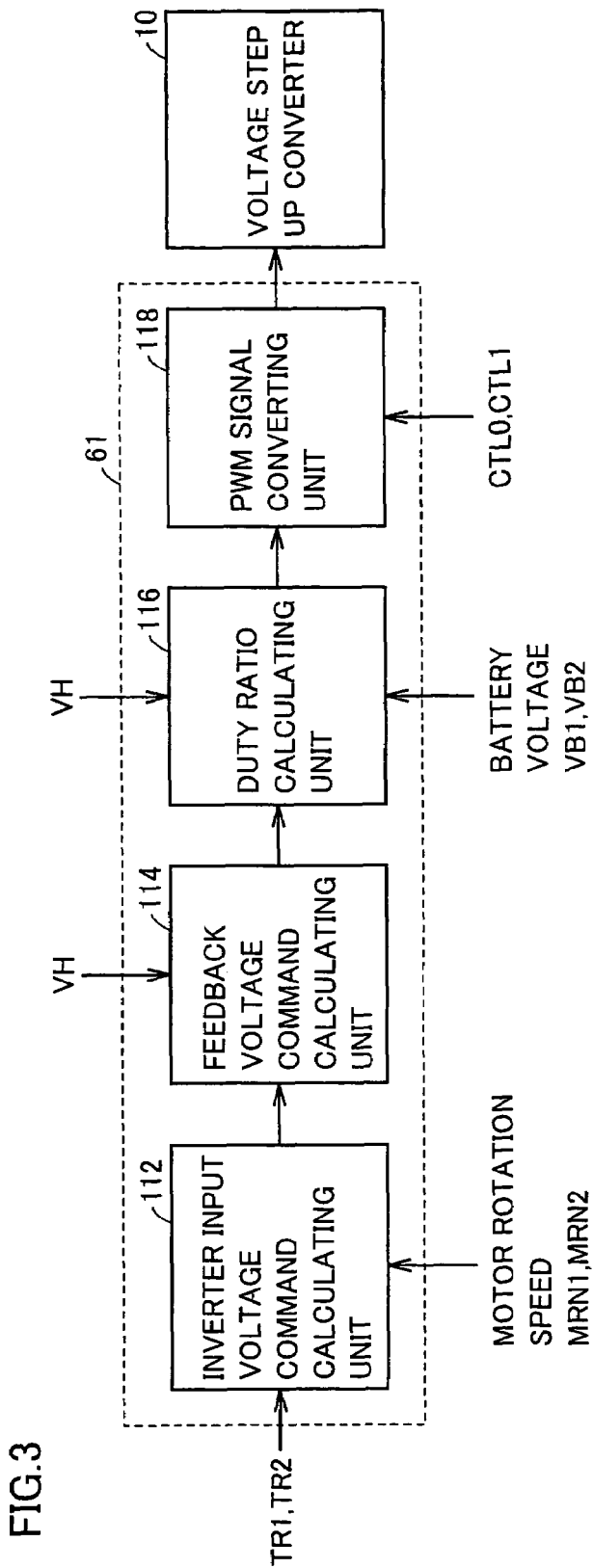
FIG. 3 is a functional block diagram of a converter control unit 61 shown in FIG. 2.

FIG. 3 is a functional block diagram of converter control unit 61 shown in FIG. 2.

Referring to FIG. 3, converter control unit 61 includes an inverter input voltage command calculating unit 112, a feedback voltage command calculating unit 114, a duty ratio calculating unit 116, and a PWM signal converting unit 118.

Based on torque control values TR1, TR2 and motor rotation speeds MRN1, MRN2, inverter input voltage command calculating unit 112 calculates an optimal value (target value), namely, a voltage command VH_com, of an inverter input voltage, and outputs the calculated voltage command VH_com to feedback voltage command calculating unit 114.

Based on output voltage VH of voltage step up converter 10 detected by voltage sensor 72 and voltage command VH_com from inverter input voltage command calculating unit 112, feedback voltage command calculating unit 114 calculates a feedback voltage command VH_com_fb for controlling output voltage VH to be voltage command VH_com, and outputs the calculated feedback voltage command VH_com_fb to duty ratio calculating unit 116.

Based on battery voltages VB1, VB2 from voltage sensor 70 and feedback voltage command VH_com_fb from feedback voltage command calculating unit 114, duty ratio calculating unit 116 calculates a duty ratio for controlling output voltage VH of voltage step up converter 10 to be a voltage command VH_corn, and outputs the calculated duty ratio to PWM signal converting unit 118.

Based on the duty ratio received from duty ratio calculating unit 116, PWM signal converting unit 118 generates a pulse width modulation (PWM) signal for turning on/off NPN-type transistors Q1, Q2 in voltage step up converter 10, and outputs the generated PWM signal to NPN-type transistors Q1, Q2 of voltage step up converter 10 as signal PWC.

By allowing NPN-type transistor Q2 in the lower arm of voltage step up converter 10 to have a longer on-time in the duty ratio, an amount of electric power to be stored in reactor L is increased, and hence it is possible to obtain an output at a higher voltage. In contrast, by allowing NPN-type transistor Q1 in the upper arm to have a longer on-time in the duty ratio, the voltage on power supply line PL2 is lowered. Accordingly, by controlling the duty ratio of each of NPN-type transistors Q1, Q2, it is possible to control the voltage on power supply line PL2 to be an arbitrary voltage equal to or higher than the output voltage of battery B1.

Furthermore, when control signal CTL1 is activated, PWM signal converting unit 118 brings NPN-type transistor Q1 into a conduction state, and brings NPN-type transistor Q2 into a non-conduction state, regardless of an output of duty ratio calculating unit 116. It is thereby possible to allow a charging current to flow from power supply line PL2 to power supply line PL1.

Figure 4:
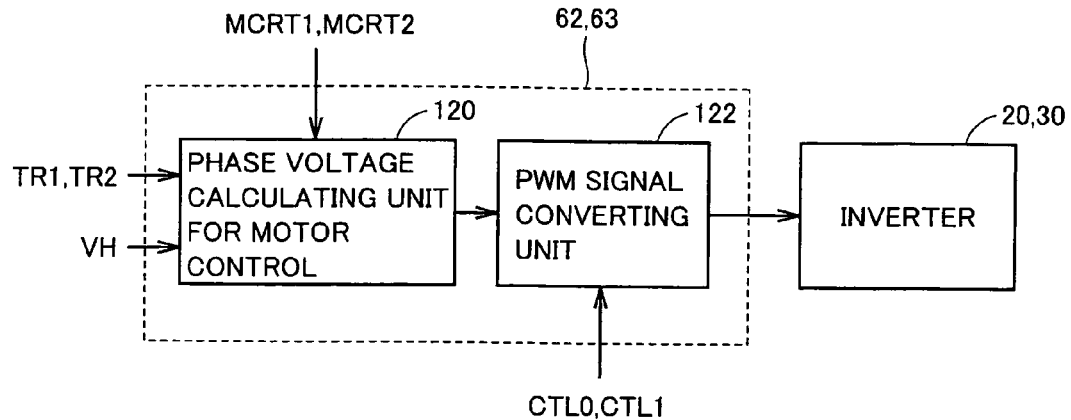
FIG. 4 is a functional block diagram of first and second inverter control units 62, 63 shown in FIG. 2.

FIG. 4 is a functional block diagram of first and second inverter control units 62, 63 shown in FIG. 2.

Referring to FIG. 4, each of first and second inverter control units 62, 63 includes a phase voltage calculating unit 120 for motor control, and a PWM signal converting unit 122.

Phase voltage calculating unit 120 for motor control receives input voltage VH of inverters 20, 30 from voltage sensor 72, receives from current sensor 80 (or 82) motor current MCRT1 (or MCRT2) flowing through the coil of each of the phases in motor generator MG1 (or MG2), and receives torque control value TR1 (or TR2) from the ECU. Based on these input values, phase voltage calculating unit 120 for motor control calculates a voltage to be applied to the coil of each of the phases in motor generator MG1 (or MG2), and outputs the calculated voltage to be applied to the coil of each of the phases to PWM signal converting unit 122.

When PWM signal converting unit 122 receives a control signal CTL0 from AC input control unit 64, it generates a signal PWM1_0 (a type of signal PWM1) (or PWM2_0 (a type of signal PWM2)) that actually turns on/off each of NPN-type transistors Q11-Q16 (or Q21-Q26) in inverter 20 (or 30), based on the voltage command for the coil of each of the phases received from phase voltage calculating unit 120 for motor control, and outputs the generated signal PWM1_0 (or PWM2_0) to each of NPN-type transistors Q11-Q16 (or Q21-Q26) in inverter 20 (or 30).

As such, switching control is performed on each of NPN-type transistors Q11-Q16 (or Q21-Q26), and a current to flow through the coil of each of the phases in motor generator MG1 (or MG2) is controlled such that motor generator MG1 (or MG2) outputs the commanded torque. As a result, motor torque in accordance with torque control value TR1 (or TR2) is output.

Furthermore, when PWM signal converting unit 122 receives control signal CTL1 from AC input control unit 64, it generates signal PWM1_1 (a type of signal PWM1) (or PWM2_1 (a type of signal PWM2)) that turns on/off NPN-type transistors Q11-Q16 (or Q21-Q26) such that an in-phase alternating current flows through U-phase arm 22 (or 32), V-phase arm 24 (or 34), and W-phase arm 26 (or 36) of inverter 20 (or 30), regardless of an output of phase voltage calculating unit 120 for motor control, and outputs the generated signal PWM1_1 (or PWM2_1) to NPN-type transistors Q11-Q16 (or Q21-Q26) in inverter 20 (or 30).

When an in-phase alternating current flows through the U, V, and W-phase coils, no rotational torque is generated in motor generators MG1, MG2. By controlling inverters 20, 30 in a coordinated manner, alternating voltage VAC is converted into a direct charging voltage.

A method of generating a direct charging voltage in vehicle 100 from alternating voltage VAC for a commercial power supply will now be described.

Figure 5:
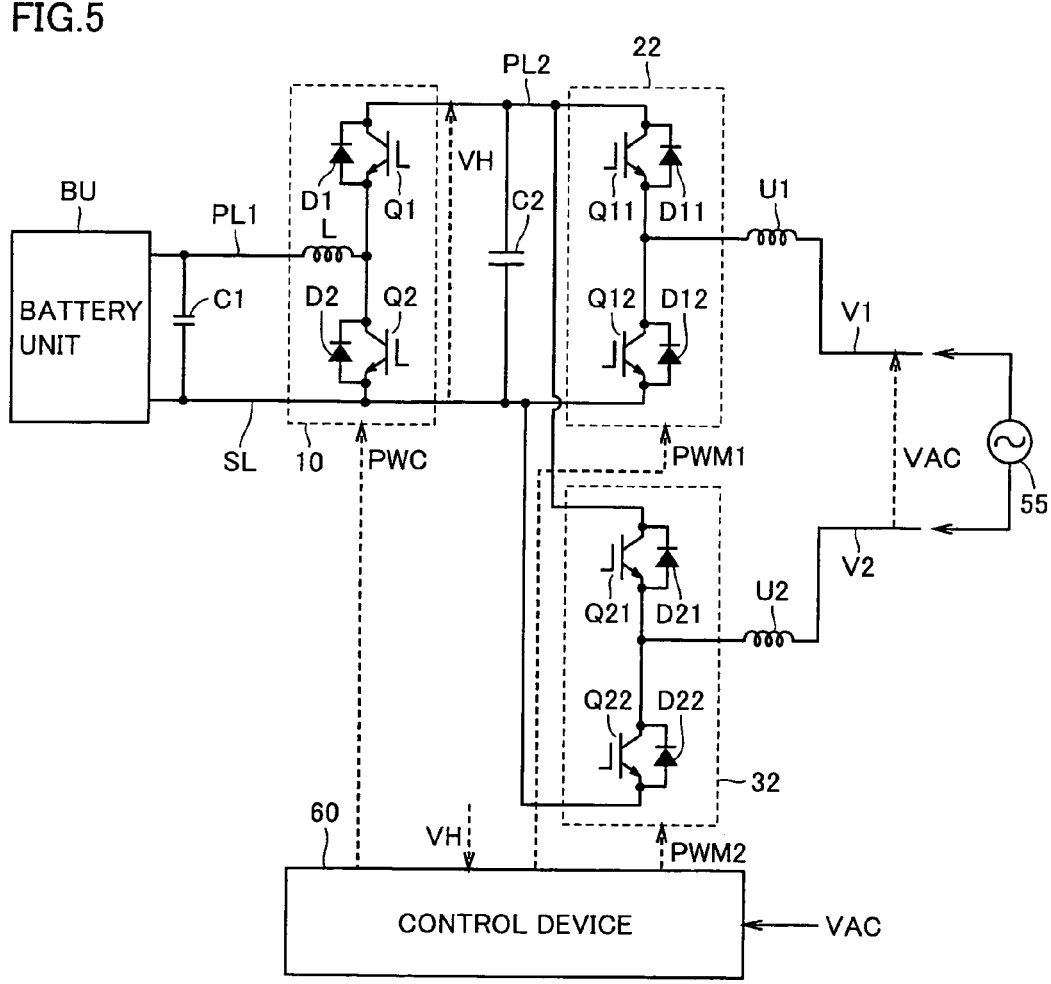
FIG. 5 is a diagram of the circuit diagram in FIG. 1, which circuit diagram is simplified to focus on a portion relating to charging.

FIG. 5 is a diagram of the circuit diagram in FIG. 1, which circuit diagram is simplified to focus on a portion relating to charging.

In FIG. 5, the U-phase arm in each of inverters 20, 30 in FIG. 1 is shown as a representative example. Furthermore, the U-phase coil out of three-phase coils in each of the motor generators is shown as a representative example. If a description of the U-phase is made as a representative example, the description of other phases will not be required because an in-phase current flows through the coils of each of the phases, and hence the circuits of other two phases operate similarly to that of the U-phase. As seen from FIG. 5, each of a set of U-phase coil U1 and U-phase arm 22 and a set of U-phase coil U2 and U-phase arm 32 has a configuration similar to that of voltage step up converter 10. Accordingly, it is possible not only to convert an alternating voltage of 100V, for example, into a direct voltage, but also to step up the direct voltage to a battery charging voltage of approximately 200V.

Figures 6, 7:
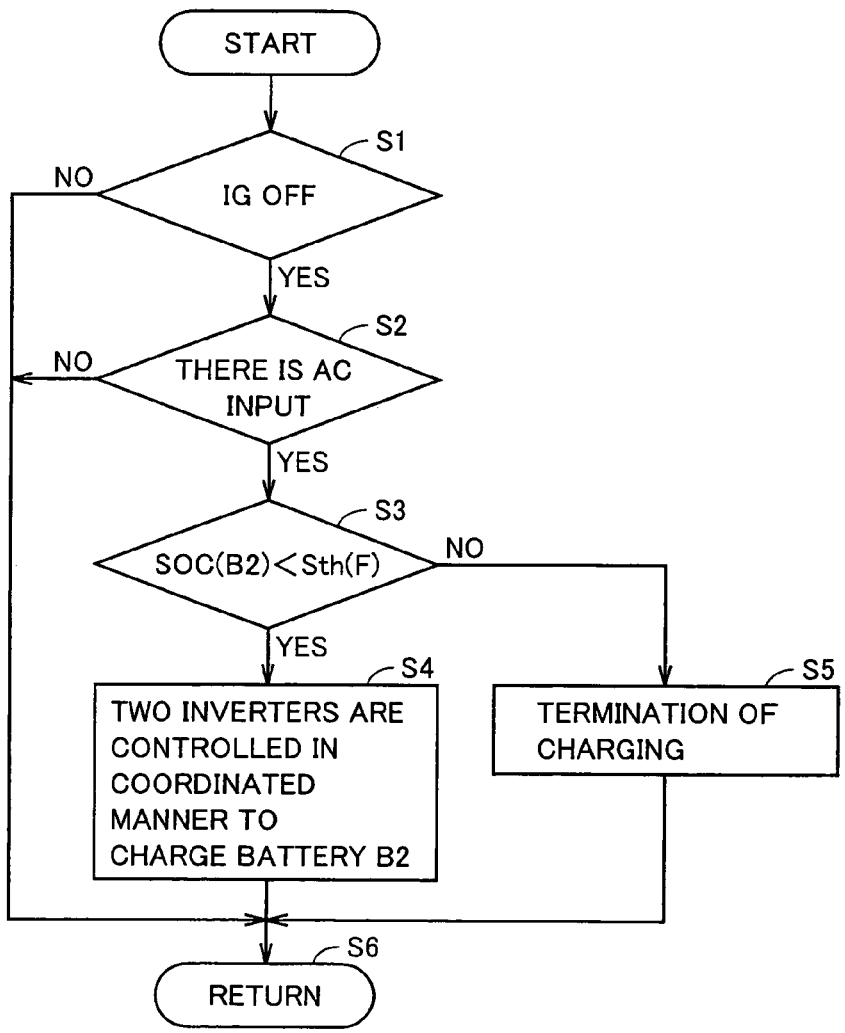
FIG. 6 is a diagram showing a control state of a transistor during charging.
FIG. 7 is a flowchart showing a control structure of a program relating to a determination as to the start of charging, which determination is made by control device 60 shown in FIG. 1.

FIG. 6 is a diagram showing a control state of the transistor during charging.

Referring to FIGS. 5 and 6, initially, if voltage VAC>0, in other words, a voltage V1 on line ACL1 is higher than a voltage V2 on line ACL2, transistor Q1 in the voltage step up converter is brought into an on state, while a transistor Q2 in the voltage step up converter is brought into an off state. Voltage step up converter 10 can thereby allow a charging current to flow from power supply line PL2 to power supply line PL1.

In the first inverter, transistor Q12 is switched in a cycle and at a duty ratio in accordance with voltage VAC, while transistor Q11 is controlled to be in an off state or in a switching state in which transistor Q11 is brought into conduction in synchronization with the conduction of diode D11. At that time, in the second inverter, transistor Q21 is brought into an off state, while transistor Q22 is controlled to be in an on state.

If voltage VAC>0, a current flows through a path from coil U1 through transistor Q12 and diode D22 to coil U2, with transistor Q12 being in an on state. The energy stored in coils U1, U2 at that time is released when transistor Q12 is brought into an off state, and a current flows through diode D11 to power supply line PL2. In order to reduce loss due to diode D11, transistor Q11 may be brought into conduction in synchronization with the conduction period of diode D11. Based on the values of voltage VAC and voltage VH, a voltage step up ratio is determined, so that a switching cycle and a duty ratio of transistor Q12 are determined.

Next, if voltage VAC<0, in other words, voltage V1 on line ACL1 is lower than voltage V2 on line ACL2, transistor Q1 in the voltage step up converter is brought into an on state, while transistor Q2 in the voltage step up converter is brought into an off state. Voltage step up converter 10 can thereby allow a charging current to flow from power supply line PL2 to power supply line PL1.

In the second inverter, transistor Q22 is switched in a cycle and at a duty ratio in accordance with voltage VAC, while transistor Q21 is controlled to be in an off state or in a switching state in which transistor Q21 is brought into conduction in synchronization with the conduction of diode D21. At that time, in the first inverter, transistor Q11 is brought into an off state, while transistor Q12 is controlled to be in an on state.

If voltage VAC<0, a current flows through a path from coil U2 through transistor Q22 and diode D12 to coil U1, with transistor Q22 being in an on state. The energy stored in coils U1, U2 at that time is released when transistor Q22 is brought into an off state, and a current flows through diode D21 to power supply line PL2. In order to reduce loss due to diode D21, transistor Q21 may be brought into conduction in synchronization with the conduction period of diode D21. At that time, based on the values of voltage VAC and voltage VH, a voltage step up ratio is also determined, so that a switching cycle and a duty ratio of transistor Q22 are determined.

FIG. 7 is a flowchart showing a control structure of a program relating to a determination as to the start of charging, which determination is made by control device 60 shown in FIG. 1. The process in the flowchart is invoked from a main routine whenever a certain time has passed or a prescribed condition is established, for execution.

Referring to FIGS. 1 and 7, initially in step S1, control device 60 determines whether or not signal IG is in an off state. If signal IG is not in an off state in step S1, the present state is not suitable for connecting a charging cable to the vehicle for charging. Accordingly, the process proceeds to step S6, and the control is returned to the main routine.

In step S1, if signal IG is in an off state, it is determined that the present state is suitable for charging, and the process proceeds to step S2. In step S2, relays RY1 and RY2 are controlled to be in a conduction state from a non-conduction state, and voltage VAC is measured by voltage sensor 74. If an alternating voltage is not observed, it is assumed that the charging cable is not connected to a socket of connector 50, and hence charging is not performed and the process proceeds to step S6. The control is returned to the main routine.

In contrast, if an alternating voltage is observed as voltage VAC in step S2, the process proceeds to step S3. In step 3, it is determined whether or not the state of charge of battery B2 SOC(B2) is lower than a threshold value Sth(F) indicative of a fully-charged state.

If SOC (B2)<Sth(F) is established, battery B2 is in a chargeable state, and hence the process proceeds to step S4. In step S4, control device 60 controls the two inverters in a coordinated manner to charge battery B2.

In step S3, if SOC (B2)<Sth(F) is not established, battery B2 is in a fully-charged state, and requires no charging. The process therefore proceeds to step S5. In step S5, charging is terminated. Specifically, inverters 20 and 30 are stopped and relays RY1, RY2 are released, so that an input of the alternating-current electric power to vehicle 100 is shut off. The process proceeds to step S6, and the control is returned to the main routine.

Figure 8:
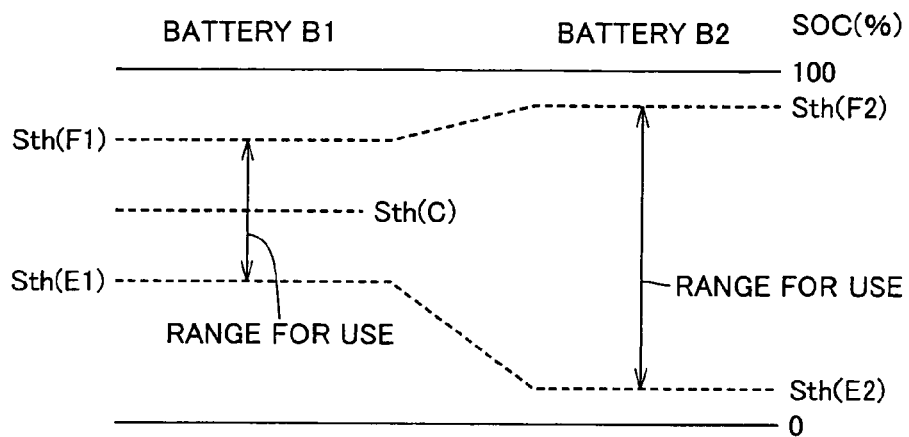
FIG. 8 is a conceptual diagram for describing a difference in characteristic between batteries B1, B2 in FIG. 1.

FIG. 8 is a conceptual diagram for describing a difference in characteristic between batteries B1, B2 in FIG. 1.

As described above, in battery unit BU, a combination of batteries B1, B2 is selected such that battery B2 has larger electricity storage capacity than battery B1 has, and instead that battery B1 has larger maximum allowed output electric power than battery B2 has.

When a secondary battery such as a nickel metal hydride battery or a lithium-ion battery is used for battery B1 and an inexpensive, high-capacity, lead-acid battery is used for battery B2, a range for use is set in each of the batteries as shown in FIG. 8.

The range for use of battery B1 is controlled to fall within the range having the lower limit of Sth (E1) and the upper limit of Sth (F1), while a state where SOC is at Sth (C) is set as a standard condition. For example, Sth (C)=60%, Sth (E1)=40%, and Sth (F1)=80%. As to the secondary battery such as a nickel metal hydride battery or the lithium-ion battery, if the SOC is controlled to be such an intermediate value, it can achieve improved charging performance for a long period of time.

In contrast, the range for use of battery B2 is controlled to fall within the range having the lower limit of Sth (E2) and the upper limit of Sth (F2). Here, Sth (E2)<Sth (E1) and Sth (F2)>Sth (F1). For example, Sth (E2)=10%, and Sth (F2)=90%.

Figure 9:
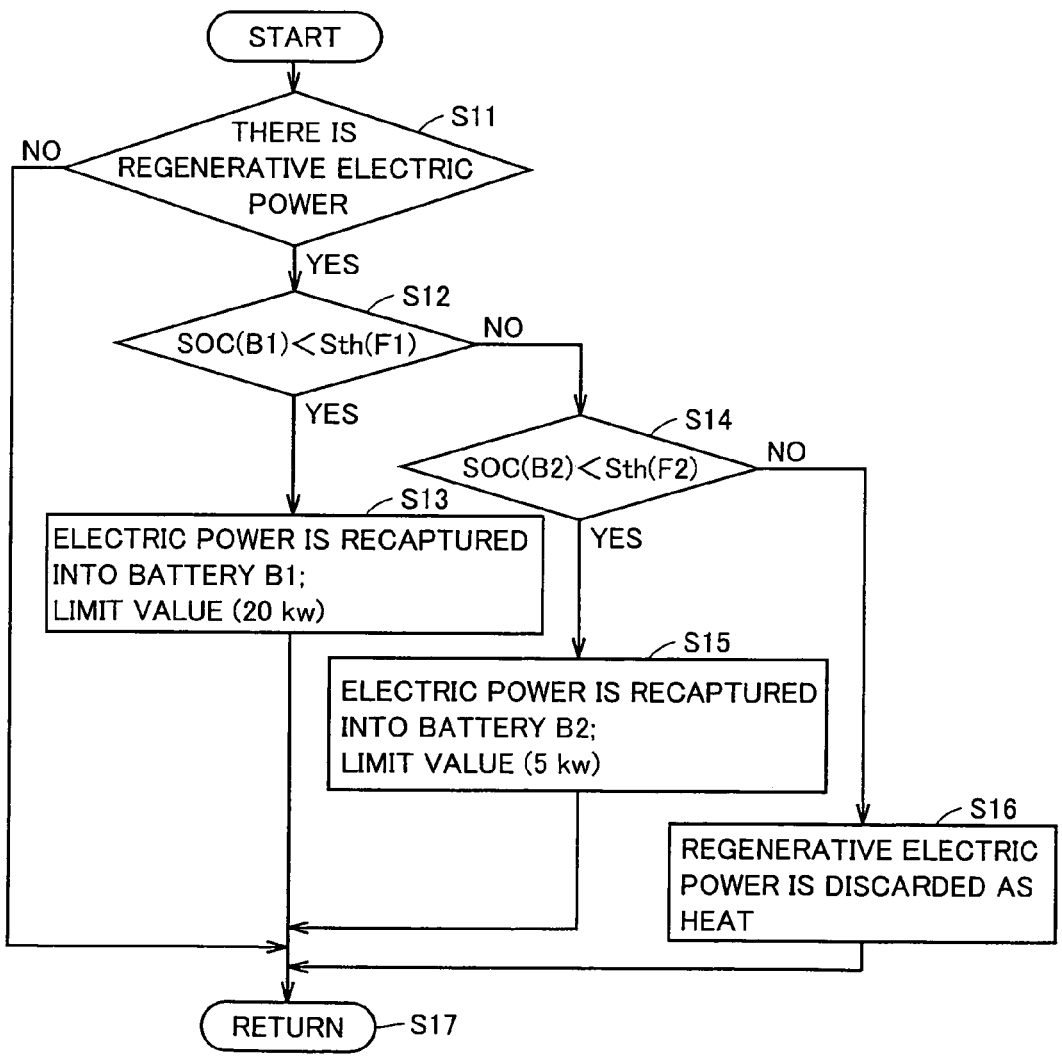
FIG. 9 is a flowchart showing a control structure of a program relating to battery selection in recapturing regenerative electric power, which battery selection is made by control device 60 in FIG. 1.

FIG. 9 is a flowchart showing a control structure of a program relating to battery selection in recapturing regenerative electric power, which battery selection is made by control device 60 in FIG. 1. The process in the flowchart is invoked from the main routine whenever a certain time has passed, or a prescribed condition is established, for execution.

Referring to FIGS. 1 and 9, the power supply device of vehicle 100 has a battery B1 serving as a first electric storage device, a battery B2 serving as a second electric storage device, a motor generator MG2 driving a wheel, selection switch RY0 selecting one of the first and second electric storage devices and connecting the selected electric storage device to motor generator MG2, and control device 60 controlling switching of selection switch RY0 in accordance with the state of charge of each of the first and second electric storage devices. In the case where the selection switch RY0 selects battery B1, when the state of charge of battery B1 becomes higher than a first prescribed level by charging, control device 60 instructs the selection switch to select the second electric storage device.

At that time, the charging in the case where selection switch RY0 selects battery B1 is preferably performed with regenerative electric power generated during a regenerative braking operation of motor generator MG2 during running of the vehicle.

Preferably, in the case where the selection switch selects battery B2, when the state of charge of battery B2 becomes lower than a second prescribed level, control device 60 instructs the selection switch to select the first electric storage device. The second prescribed level may be set to be equal to the first prescribed level, namely, set to Sth (C), or alternatively, both of the first and second prescribed levels may be set to different values.

The charging operation above will now be described in detail. Initially, when the process starts, control device 60 determines in step S11 whether or not there is regenerative electric power. For example, in the case of deceleration from high-speed running, or in the case of braking to prevent acceleration in a downslope, the vehicle generates electric power by means of motor generator MG2 mechanically coupled to the wheel, and recaptures the electric power. Such a case corresponds to the case where there is regenerative electric power.

In step S11, if there is no regenerative electric power, the process proceeds to step S17, and the control is returned to the main routine. In contrast, if there is regenerative electric power in step S11, the process proceeds to step S12. In step S12, it is determined whether or not the state of charge of battery B1 SOC (B1) is lower than prescribed threshold value Sth (F1) in FIG. 8.

If SOC (B1)<Sth (F1) is established in step S12, the process proceeds to step S13, and battery B1 is selected as a place where the recaptured electric power is to be stored. An electric power recapture limit value at that time is set to, for example, 20 kW. If regenerative electric power is generated beyond the limit value, excess electric power is discarded as heat.

In contrast, if SOC (B1)<Sth (F1) is not established in step S12, the process proceeds to step S14. In step S14, it is determined whether or not the state of charge of battery B2 SOC (B2) is lower than prescribed threshold value Sth (F2) in FIG. 8.

If SOC (B2)<Sth (F2) is established in step S14, the process proceeds to step S15, and battery B2 is selected as a place where the recaptured electric power is to be stored. An electric power recapture limit value at that time is set to, for example, 5 kW. If regenerative electric power is generated beyond the limit value, excess electric power is discarded as heat.

In contrast, if SOC (B2)<Sth (F2) is not established in step S14, it is determined that additional electric power cannot be recaptured in the batteries, and hence the process proceeds to step S16. In step S16, the regenerative electric power is discarded as heat.

If any of the steps in steps S13, S15, and S16 is terminated, the process proceeds to step S17, and the control is returned to the main routine.

Figure 10:
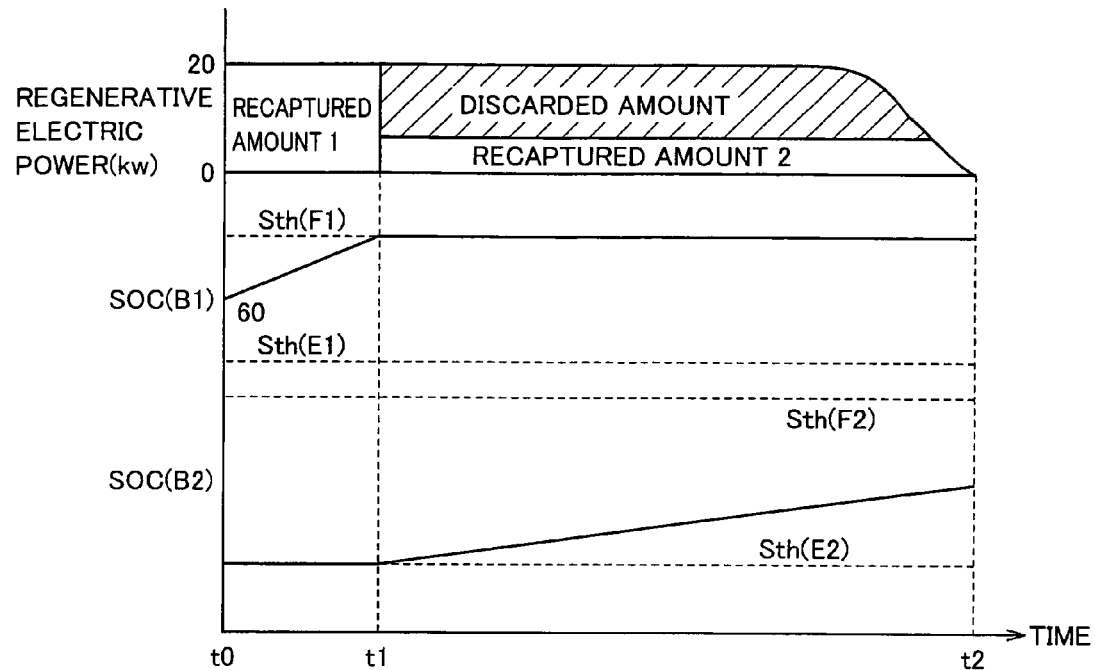
FIG. 10 is a diagram for describing recapture of regenerative electric power in the first embodiment.

FIG. 10 is a diagram for describing recapture of regenerative electric power in the first embodiment.

Referring to FIG. 10, battery B1 is charged at times t0-t1, and thereby a recaptured amount 1 of regenerative electric power is recaptured. At time t1, when the SOC of battery B1 reaches Sth (F1) indicative of a fully-charged state, control device 60 allows the process to proceed from step S12 to step S14 in FIG. 9. Since the SOC of battery B2 is at Sth (E2) indicative of an almost empty state, battery B2 is selected as a place where regenerative electric power is stored, and the process in step S15 proceeds.

Figure 14:
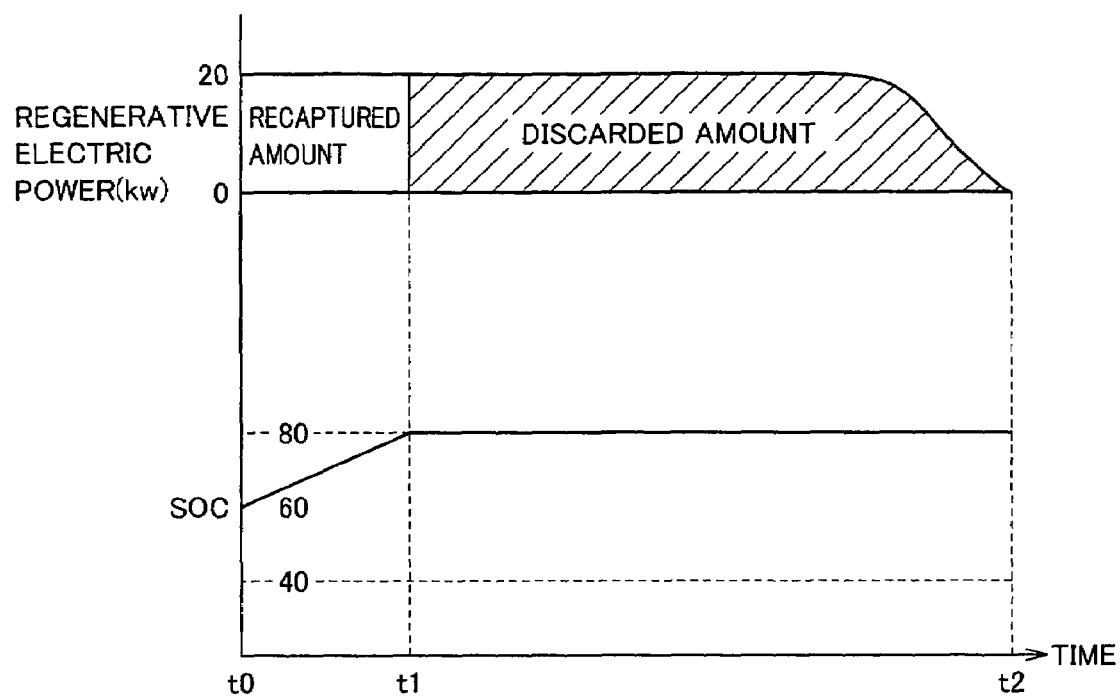
FIG. 14 is a diagram for describing electric power discarded as heat during regenerative braking.

A recaptured amount 2 of electric power is stored at times t1-t2, resulting in that the SOC of battery B2 gradually increases. In other words, an additional amount of electric power, which corresponds to recaptured amount 2 of electric power, is recaptured, when compared with the case in FIG. 14, and hence energy efficiency is improved.

As described above, in the first embodiment, an additional amount of regenerative electric power can be recaptured in battery B2, when compared with the common hybrid vehicle. Accordingly, if a commuting route includes a mountain pass, it is possible to increase the mileage per charge. The frequency with which the fuel is thereby consumed is decreased, and the frequency of refueling is further decreased.

Second Embodiment

In the second embodiment, battery unit BU is replaced with a battery unit BU1, in the configuration of FIG. 1. Other configurations are similar to those in the first embodiment, and hence the description thereof will not be repeated.

Figure 11:
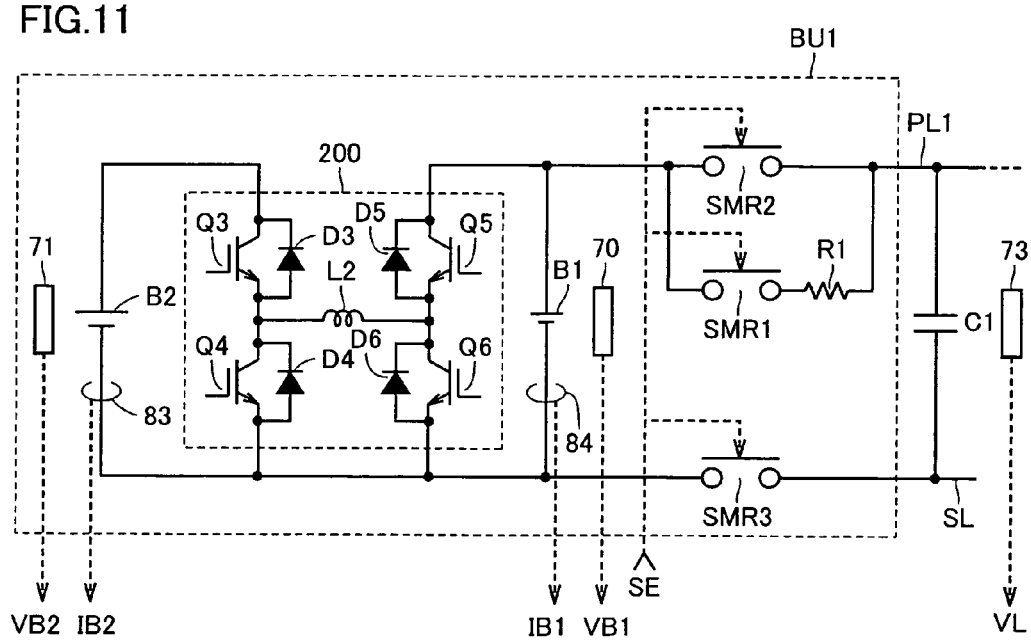
FIG. 11 is a circuit diagram showing a configuration of a battery unit BU1 used in a second embodiment.

FIG. 11 is a circuit diagram showing a configuration of battery unit BU1 used in the second embodiment.

Referring to FIG. 11, battery unit BU1 includes batteries B1, B2 serving as electric storage devices whose negative electrodes are connected to each other, system main relays SMR1-SMR3 connecting battery B1 to the vehicle load, voltage sensors 70, 71 measuring voltages of batteries B1, B2, respectively, current sensors 84, 83 measuring currents of batteries B1, B2, respectively, and a DC/DC converter 200 connected between battery B1 and battery B2, and capable of transferring electric power bidirectionally. The combination of batteries B1, B2 is similar to that described in the first embodiment, and hence the description thereof will not be repeated.

System main relay SMR1 is connected in series with a limiting resistor R1 between a positive electrode of battery B1 and power supply line PL1. System main relay SMR2 is connected between the positive electrode of battery B1 and power supply line PL1. System main relay SMR3 is connected between negative electrodes of batteries B1, B2, and ground line SL. System main relays SMR1-SMR3 are controlled to be in a conduction/non-conduction state, in accordance with a control signal SE supplied from control device 60.

DC/DC converter 200 includes a first arm connected between the terminals of battery B2, a second arm connected between the power supply terminals of battery B1, and a reactor L2 connected between the first and second arms.

The first arm includes NPN-type transistors Q3, Q4 connected in series between a positive electrode and a negative electrode of battery B2, a diode D3 connected in parallel with NPN-type transistor Q3, and a diode D4 connected in parallel with NPN-type transistor Q4.

NPN-type transistor Q3 has a collector connected to the positive electrode of battery B2, and an emitter connected to one end of reactor L2. Diode D3 is connected such that a direction from the emitter to the collector of NPN-type transistor Q3 is set as its forward direction.

NPN-type transistor Q4 has a collector connected to one end of reactor L2, and an emitter connected to the negative electrode of battery B2. Diode D4 is connected such that a direction from the emitter to the collector of NPN-type transistor Q4 is set as its forward direction.

The second arm includes NPN-type transistors Q5, Q6 connected in series between the positive electrode and the negative electrode of battery B1, a diode D5 connected in parallel with NPN-type transistor Q5, and a diode D6 connected in parallel with NPN-type transistor Q6.

NPN-type transistor Q5 has a collector connected to the positive electrode of battery B1, and an emitter connected to the other end of reactor L2. Diode D5 is connected such that a direction from the emitter to the collector of NPN-type transistor Q5 is set as its forward direction.

NPN-type transistor Q6 has a collector connected to the other end of reactor L2, and an emitter connected to the negative electrode of battery B1. Diode D6 is connected such that a direction from the emitter to the collector of NPN-type transistor Q6 is set as its forward direction.

The ranges that can be covered by voltage VB2 of battery B2 and voltage VB1 of battery B1 overlap partially. For example, when a nickel metal hydride battery or the like is used for battery B1, the power supply voltage thereof varies within a range of, for example, 200 V-300 V. Alternatively, when a lead-acid battery or the like is used for battery B1, the output voltage thereof also varies within a range of, for example, 200 V-300 V. Accordingly, if battery B2 is in a fully-charged state and battery B1 is empty, it is assumed that the voltage of battery B2 is higher than that of battery B1. In contrast, if battery B1 is in a fully-charged state and battery B2 is empty, it is assumed that the voltage of battery B1 is higher than that of battery B2.

In such cases, in order to charge battery B2, or to allow electric power in battery B2 to be used preferentially, DC/DC converter 200 has a configuration having the first and second arms as described above. With this configuration, it is possible to step up and step down the voltage from the battery B2 side to the battery B1 side, and it is also possible to step up and step down the voltage from the battery B1 side to the battery B2 side.

Figure 12:
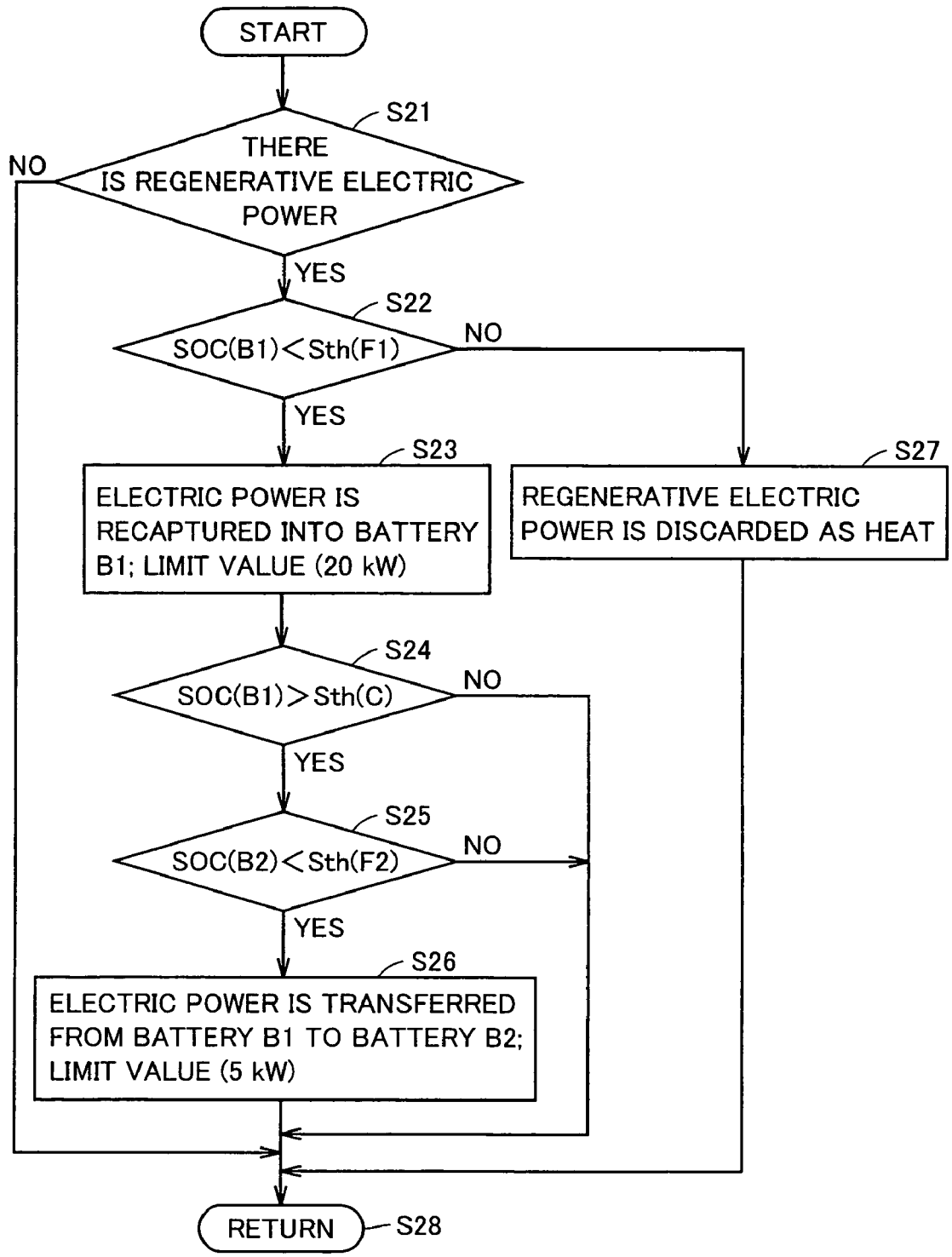
FIG. 12 is a flowchart showing a control structure of a program relating to battery selection in recapturing regenerative electric power, which battery selection is made by control device 60 in the second embodiment.

FIG. 12 is a flowchart showing a control structure of a program relating to battery selection in recapturing regenerative electric power, which battery selection is made by control device 60 in the second embodiment. The process in the flowchart is invoked from the main routine whenever a certain time has passed, or a prescribed condition is established, for execution.

Referring to FIGS. 11, 12, in the second embodiment, the power supply device for a vehicle includes a battery B1 serving as a first electric storage device, a battery B2 serving as a second electric storage device, a motor generator MG2 receiving electric power from battery B1 to drive a wheel, DC/DC converter 200 provided between batteries B1, B2 and serving as a voltage converting unit receiving and transferring electric power between batteries B1, B2, and control device 60 controlling DC/DC converter 200 in accordance with the state of charge of each of batteries B1, B2. When the state of charge of battery B1 becomes higher than the first prescribed level by charging, control device 60 instructs DC/DC converter 200 to perform a voltage converting operation such that battery B2 is charged from battery B1.

Charging of battery B1 at that time is performed with regenerative electric power generated during a regenerative braking operation of the first rotating electric machine during running of the vehicle. Of course, in the case where charging is performed by externally receiving an alternating-current electric power at a neutral point of the motor generator, control device 60 may similarly instruct DC/DC converter 200 to perform a voltage converting operation such that battery B2 is charged from battery B1.

Preferably, control device 60 instructs DC/DC converter 200 to perform a voltage converting operation such that battery B1 is charged from battery B2, when the energy in battery B1 is consumed through running, for example, and the state of charge of battery B1 becomes lower than the second prescribed level.

In the following, the process during charging will further be described in detail. Initially, when the process starts, control device 60 determines in step S21 whether or not there is regenerative electric power. For example, in the case of deceleration from high-speed running, or in the case of braking to prevent acceleration in a downslope, the vehicle generates electric power by means of motor generator MG2 mechanically coupled to the wheel, and recaptures the electric power. Such a case corresponds to the case where there is regenerative electric power.

In step S21, if there is no regenerative electric power, the process proceeds to step S28, and the control is returned to the main routine. In contrast, if there is regenerative electric power in step S21, the process proceeds to step S22. In step S22, it is determined whether or not the state of charge of battery B1 SOC (B1) is lower than prescribed threshold value Sth (F1) in FIG. 8.

In step S22, if SOC (B1)<Sth (F1) is established, the process proceeds to step S23, and battery B1 is selected as a place where recaptured electric power is stored. The electric power recapture limit value at that time is set to, for example, 20 kW. If regenerative electric power is generated beyond the limit value, excess electric power is discarded as heat.

In contrast, if SOC (B1)<Sth (F1) is not established in step S22, the process proceeds to step S27. In such a case, battery B1, which is to receive regenerative electric power, is in a fully-charged state, and hence regenerative electric power is discarded as heat.

If battery B1 is charged in step S23, it is determined in step S24 whether or not the state of charge of battery B1 exceeds Sth (C) indicative of the standard condition in FIG. 8.

If SOC (B1)>Sth (C) is established in step S24, the process proceeds to step S25. If SOC (B11)>Sth (C) is not established in step S24, the process proceeds to step S28.

In step S25, it is determined whether or not the state of charge of battery B2 SOC (B2) is smaller than Sth (F2) in FIG. 8. If SOC (B2)<Sth (F2) is established, battery B2 is in a chargeable state, and hence the process proceeds to step S26. In contrast, if SOC (B2)<Sth (F2) is not established, battery B2 has already been in a fully-charged state and cannot be charged, and hence the process proceeds to step S28.

In step S26, DC/DC converter 200 is driven to transfer electric power from battery B1 to battery B2. The electric power charge limit value is set to, for example, 5 kW. The process proceeds to step S28.

When the process proceeds to step S28, the control is returned to the main routine.

Figure 13:
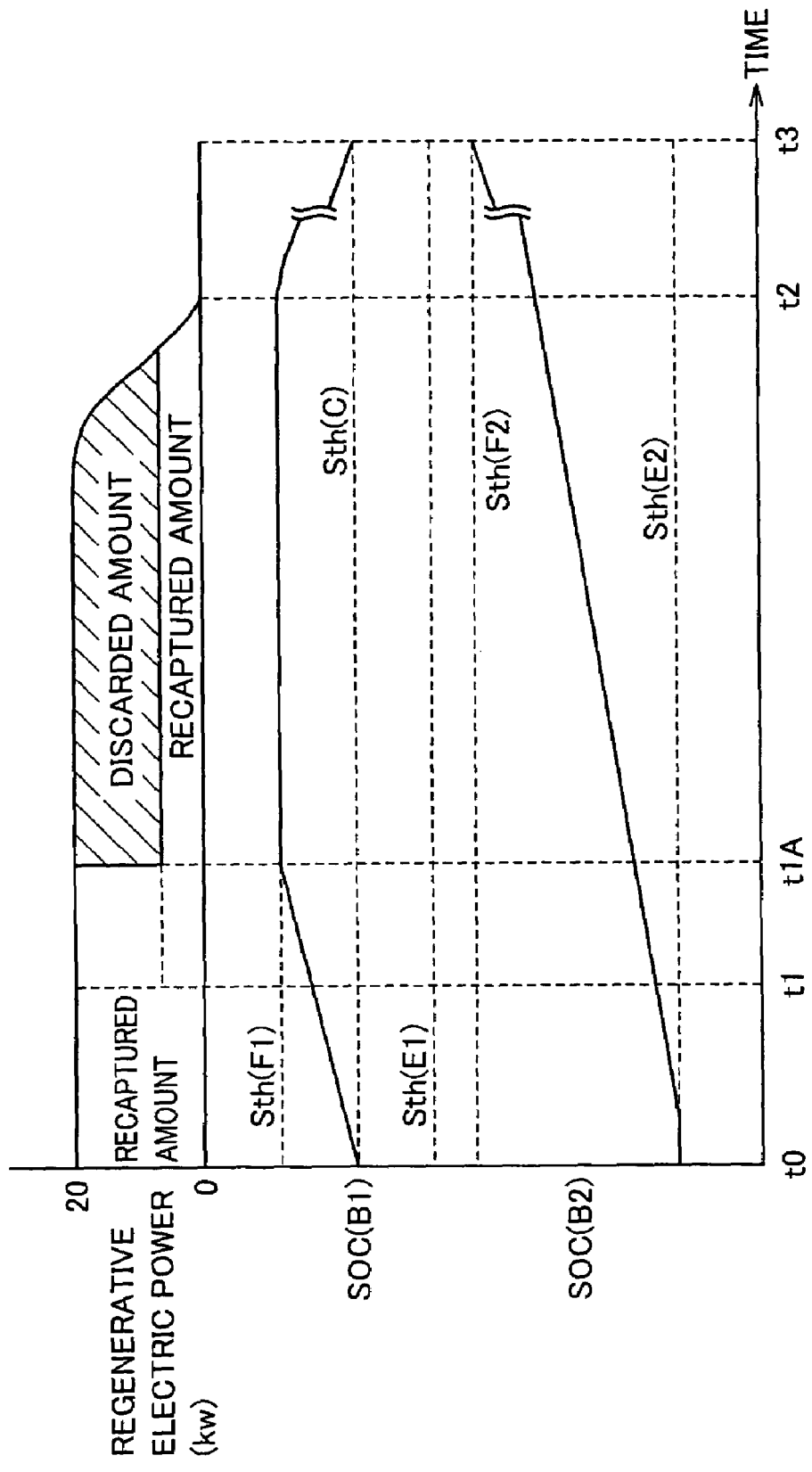
FIG. 13 is a diagram for describing recapture of regenerative electric power in the second embodiment.

FIG. 13 is a diagram for describing recapture of regenerative electric power in the second embodiment.

Referring to FIG. 13, battery B1 is charged at times t0-t1, and thereby regenerative electric power is recaptured. At the same time, SOC (B1) of battery B1 is larger than standard condition Sth (C), and hence DC/DC converter 200 is driven to transfer electric power from battery B1 to battery B2. As a result, SOC (B1) and SOC (B2) at times t0-t1 gradually increase. The rate of increase in SOC (B1) is lower than that at times t0-t1 in FIG. 10, because electric power is transferred to battery B2. Accordingly, it is possible to recapture regenerative electric power of 20 kW until time t1A.

At time t1A, SOC (B1) reaches Sth (F1) indicative of a fully-charged state, and hence electric power of 20 kW can no longer be recaptured. Accordingly, the amount of recapture is reduced to 5 kW, and remaining regenerative electric power is discarded as heat. During that time, SOC (B2) continues to increase by a recaptured amount of 5 kW.

When the downslope ends at time t2, regenerative electric power is turned to 0. Even after that, electric power is transferred from battery B1 to battery B2, and at time t3, the state of charge of battery B1 reaches Sth (C) indicative of the standard condition, and the state of charge of battery B2 reaches the maximum.

As described above, in the second embodiment, it is possible to recapture much more regenerative electric power into battery B2, when compared with the case of the first embodiment. Accordingly, if a commuting route includes a mountain pass, it is possible to further increase the mileage per charge. Accordingly, the frequency with which the fuel is consumed is decreased, and the frequency of refueling is further decreased.

As to the control in charging at home or the like when the vehicle is stopped, electric power may also be received and transferred between batteries B1, B2 in a similar manner. In this case, the determination as to whether or not there is regenerative electric power in step S21 in the flowchart of FIG. 12 may be replaced with a determination as to whether or not there is an AC input, and a step of terminating charging may be performed instead of step S27.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply device for a vehicle comprising:
    a first electric storage device;
    a second electric storage device;
    a first rotating electric machine driving a wheel;
    a selection switch selecting one of said first and second electric storage devices and connecting the selected electric storage device to said first rotating electric machine; and
    a control device controlling switching of said selection switch in accordance with a state of charge of each of said first and second electric storage devices,
    in a case where said selection switch selects said first electric storage device, when charging is performed so that the state of charge of said first electric storage device becomes higher than a first prescribed level, said control device instructing said selection switch to select said second electric storage device.

2. The power supply device for the vehicle according to claim 1, wherein said charging in the case where said selection switch selects said first electric storage device is performed with regenerative electric power generated during a regenerative braking operation of said first rotating electric machine during running of the vehicle.

3. The power supply device for the vehicle according to claim 1, wherein, in a case where said selection switch selects said second electric storage device, when the state of charge of said second electric storage device becomes lower than a second prescribed level, said control device instructs said selection switch to select said first electric storage device.

4. The power supply device for the vehicle according to claim 1, wherein said second electric storage device has larger electricity storage capacity than said first electric storage device has.

5. The power supply device for the vehicle according to claim 1, wherein said first electric storage device has larger maximum chargeable electric power than said second electric storage device has.

6. The power supply device for the vehicle according to claim 1, further comprising an input unit for receiving electric power supplied from outside of the vehicle and charging at least said second electric storage device.

7. The power supply device for the vehicle according to claim 6, further comprising:
    a first inverter provided corresponding to said first rotating electric machine;
    a second rotating electric machine; and
    a second inverter provided corresponding to said second rotating electric machine; wherein
    said input unit includes
        a first terminal connected to said first rotating electric machine, and
        a second terminal connected to said second rotating electric machine, and
    said control device controls said first and second inverters such that an alternating-current electric power supplied to said first and second terminals is converted into a direct-current electric power and supplied to said second electric storage device.

8. The power supply device for the vehicle according to claim 7, wherein
    a rotary shaft of said first rotating electric machine is mechanically coupled to a rotary shaft of said wheel, and
    the power supply device for the vehicle further comprises an internal combustion engine having a crankshaft mechanically coupled to a rotary shaft of said second rotating electric machine.

9. A power supply device for a vehicle, comprising:
    a first electric storage device;
    a second electric storage device;
    a first rotating electric machine receiving electric power from said first electric storage device and driving a wheel;
    a voltage converting unit provided between said first and second electric storage devices, for receiving and transferring electric power between said first and second electric storage devices; and
    a control device controlling said voltage converting unit in accordance with a state of charge of each of said first and second electric storage devices,
    in a case where charging of said first electric storage device is performed, when the state of charge of said first electric storage device becomes higher than a first prescribed level, said control device instructing said voltage converting unit to perform a voltage converting operation such that said second electric storage device is charged from said first electric storage device, and
    when energy in said first electric storage device is consumed and the state of charge of said first electric storage device becomes lower than a second prescribed level, said control device instructs said voltage converting unit to perform the voltage converting operation such that said first electric storage device is charged from said second electric storage device.

10. The power supply device for the vehicle according to claim 9, wherein said charging of said first electric storage device is performed with regenerative electric power generated during a regenerative braking operation of said first rotating electric machine during running of the vehicle.

11. The power supply device for the vehicle according to claim 9, wherein said second electric storage device has a larger electric storage capacity than said first electric storage device.

12. The power supply device for the vehicle according to claim 9, further comprising an input unit for receiving electric power supplied from outside of the vehicle and charging at least said second electric storage device.

13. The power supply device for the vehicle according to claim 12, further comprising:
    a first inverter provided corresponding to said first rotating electric machine;
    a second rotating electric machine; and
    a second inverter provided corresponding to said second rotating electric machine; wherein
    said input unit includes
        a first terminal connected to said first rotating electric machine, and
        a second terminal connected to said second rotating electric machine, and
    said control device controls said first and second inverters and said voltage converting unit such that an alternating-current electric power supplied to said first and second terminals is converted into a direct-current electric power, and supplied to said second electric storage device.

14. The power supply device for the vehicle according to claim 13, wherein
a rotary shaft of said first rotating electric machine is mechanically coupled to a rotary shaft of a wheel, and
the power supply device for the vehicle further comprises an internal combustion engine having a crankshaft mechanically coupled to a rotary shaft of said second rotating electric machine.

15. A power supply device for a vehicle, comprising:
a first electric storage device;
a second electric storage device;
a first rotating electric machine receiving electric power from said first electric storage device and driving a wheel;
a voltage converting unit provided between said first and second electric storage devices, for receiving and transferring electric power between said first and second electric storage devices; and
a control device controlling said voltage converting unit in accordance with a state of charge of each of said first and second electric storage devices,
in a case where charging of said first electric storage device is performed, when the state of charge of said first electric storage device becomes higher than a first prescribed level, said control device instructing said voltage converting unit to perform a voltage converting operation such that said second electric storage device is charged from said first electric storage, and
said first electric storage device has a larger maximum chargeable electric power than said second electric storage device.

16. The power supply device for the vehicle according to claim 15, wherein said charging of said first electric storage device is performed with regenerative electric power generated during a regenerative braking operation of said first rotating electric machine during running of the vehicle.

17. The power supply device for the vehicle according to claim 15, further comprising an input unit for receiving electric power supplied from outside of the vehicle and charging at least said second electric storage device.

18. A method of controlling a power supply device for a vehicle, the power supply device including first and second electric storage devices, a first rotating electric machine driving a wheel, and a selection switch selecting one of said first and second electric storage devices and connecting the selected electric storage device to said first rotating electric machine, comprising the steps of:
determining whether or not charging is performed when said selection switch selects said first electric storage device;
determining whether or not a state of charge of said first electric storage device is higher than a first prescribed level; and
instructing said selection switch to select said second electric storage device when the state of charge of said first electric storage device becomes higher than the first prescribed level.

19. The method of controlling the power supply device for the vehicle according to claim 18, wherein said charging when said selection switch selects said first electric storage device is performed with regenerative electric power generated during a regenerative braking operation of said first rotating electric machine during running of the vehicle.

20. A method of controlling a power supply device for a vehicle, the power supply device including first and second electric storage devices, a first rotating electric machine receiving electric power from said first electric storage device and driving a wheel, and a voltage converting unit provided between said first and second electric storage devices and receiving and transferring electric power between said first and second electric storage devices, comprising the steps of:
determining whether or not charging of said first electric storage device is performed;
determining whether or not a state of charge of said first electric storage device becomes higher than a first prescribed level;
instructing said voltage converting unit to perform a voltage converting operation such that said second electric storage device is charged from said first electric storage device when the state of charge of said first electric storage device becomes higher than the first prescribed level;
determining when energy in said first electric storage device is consumed such that the state of charge of said first electric storage device becomes lower than a second prescribed level; and
instructing said voltage converting unit to perform the voltage converting operation such that said first electric storage device is charged from said second electric storage device.

21. The method of controlling the power supply device for the vehicle according to claim 20, wherein said charging of said first electric storage device is performed with regenerative electric power generated during a regenerative braking operation of said first rotating electric machine during running of the vehicle.

22. A method of controlling a power supply device for a vehicle, the power supply device including first and second electric storage devices, a first rotating electric machine receiving electric power from said first electric storage device and driving a wheel, and a voltage converting unit provided between said first and second electric storage devices and receiving and transferring electric power between said first and second electric storage devices, wherein said first electric storage device has a larger maximum chargeable electric power than said second electric storage device, comprising the steps of:
determining whether or not a state of charge of said first electric storage device becomes higher than a first prescribed level when charging of said first electric storage device is performed;
instructing said voltage converting unit to perform a voltage converting operation such that said second electric storage device is charged from said first electric storage device when the state of charge of said first electric storage device becomes higher than the first prescribed level.

* * * * *